United States Patent

Anello et al.

[19]

[11] Patent Number: 5,818,917
[45] Date of Patent: Oct. 6, 1998

[54] SECURE GUARD FOR COIN-RETURN-BUCKET WINDOW OF PAYPHONE GUARD WRAP

[75] Inventors: Salvatore Anello, Fishkill; Albert F. Diaz, Lynbrook, both of N.Y.

[73] Assignee: Sandt Technology, Ltd, Marlboro, N.Y.

[21] Appl. No.: 787,872

[22] Filed: Jan. 23, 1997

[51] Int. Cl.$^6$ .......................... H04M 17/00; H04M 1/00; G07F 3/00; G07B 15/00
[52] U.S. Cl. .......................... 379/145; 194/202; 379/437; 232/15
[58] Field of Search .................................. 379/143, 145, 379/155, 147, 146, 428, 437, 440; 194/202; 232/7, 14, 15

[56] References Cited

U.S. PATENT DOCUMENTS

| | | | |
|---|---|---|---|
| 5,155,765 | 10/1992 | McGough | 379/145 |
| 5,291,981 | 3/1994 | Anello et al. | 379/145 |
| 5,555,296 | 9/1996 | McCloskey | 379/145 |

*Primary Examiner*—Paul Loomis
*Attorney, Agent, or Firm*—Joseph B. Taphorn

[57] ABSTRACT

An anti-vandalizing device prevents removal of the coin-return bucket through the coin-retrieval window of the lower-housing cover of a coin-operated telephone while still accommodating coin vault security involving use of one key by the coin collector and of a differently coded key for the upper housing by the maintenance person responsible for fixing the bucket in the lower housing. A guard ring mounted inside an aligned window of a guard wrap reduces the effective size of the guard wrap window to where the bucket cannot be retrieved therethrough even after being crushed against the anti-rocking screw while still accommodating user coin retrieval of his unused deposited coins. The guard ring is slidably mounted on the back side of the guard wrap so as to be retrievable from above in the space between the lower housing cover and the guard wrap when the upper housing is removed. In one embodiment a ridge about the perimeter of an installed guard ring window seats within the guard wrap window. Deep slide brackets enable pivotal movement of the upper end of the guard ring to enable its ridge to clear the wrap about its window. A spacer plate behind the guard ring is inserted within the deep slide brackets to hold the guard ring with its ridge seated in the wrap window. In a second embodiment, brackets depending from the inside surface of the guard ring hold the ring in the guard wrap window along with a headed stud on the inside surface of the wrap seating a locking plate having slots receiving headed studs on the upper end of the guard ring.

22 Claims, 3 Drawing Sheets

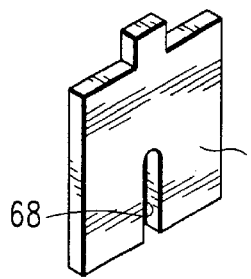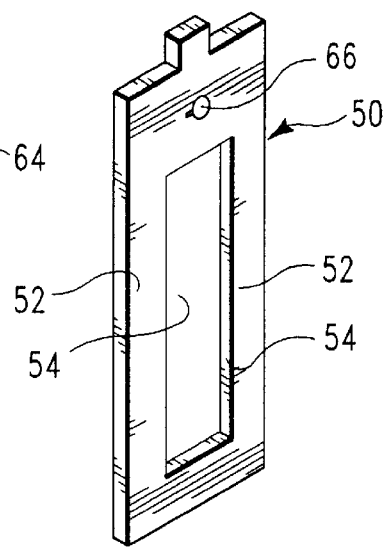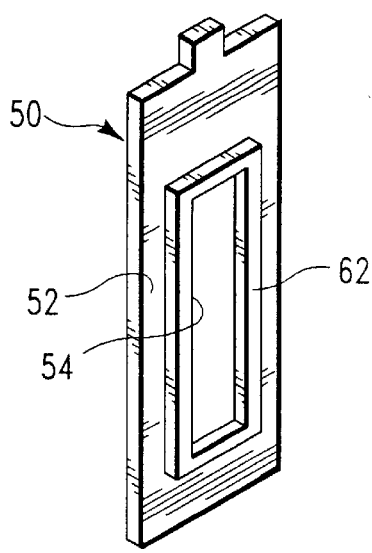
FIG. 6   FIG. 4   FIG. 5
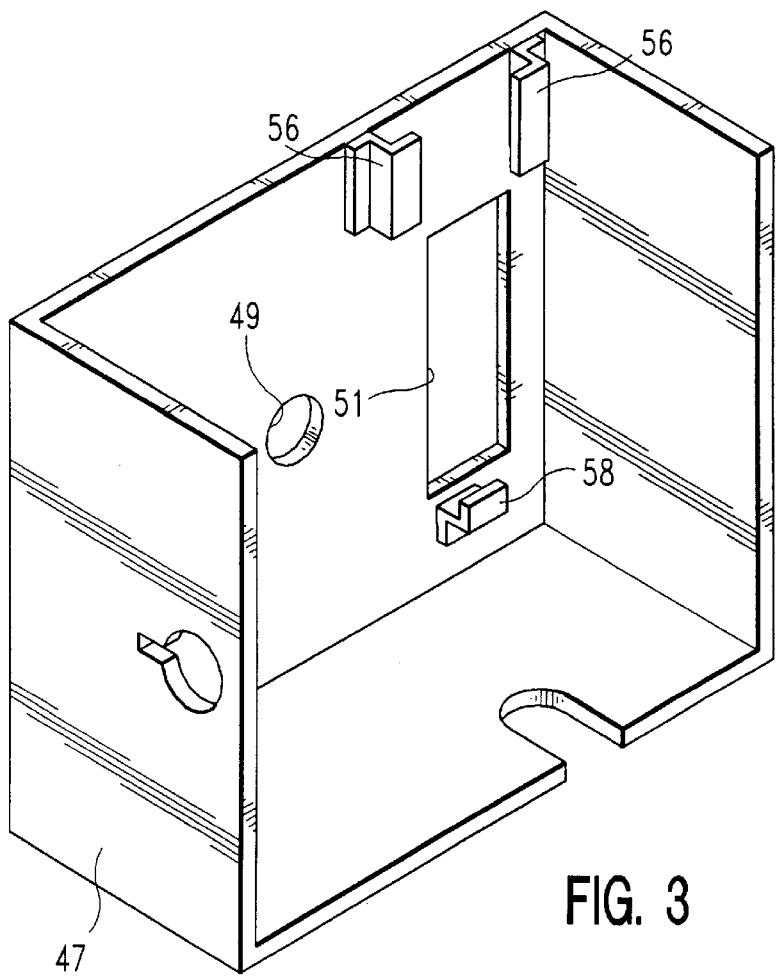
FIG. 3

SECURE GUARD FOR COIN-RETURN-BUCKET WINDOW OF PAYPHONE GUARD WRAP

1. FIELD OF THE INVENTION

This invention relates to anti-vandalizing devices for coin-return buckets of coin-operated telephones, and more particularly, to a more effective device for preventing the removal by vandals of the coin-return bucket through the coin-return window of a guard layer wrapped around the lower housing of a coin-operated telephone.

2. BACKGROUND OF THE INVENTION

Coin-operated telephones or payphones typically have an upper housing containing dialing, electronic switching, wiring and coin receiving gear, and a normally side-locked front cover for the upper housing. They also have a lower housing containing a) a bank or vault with a normally front-locked door for holding deposited coins for the telephone-company collector and b) below a chute depending through a floor from the upper housing a coin-return bucket for collecting coins being returned to the would-be telephone user for immediate retrieval by the user, and a normally side-locked front cover for the lower housing. The lower housing has a window for a telephone user to extend a finger into the bucket and for telephone-company maintenance personnel to remove and reinsert the bucket without removing the lower housing cover. The telephone-company collector periodically visits the payphone to unlock the vault and empty its contents for the telephone company.

In high crime areas, a guard layer of stainless steel or like and having a front and sides and bottom, is wrapped around the outside of the lower housing to secure further the contents of the vault. The guard-wrap front includes a window which aligns with the telephone lower-housing coin-return-bucket window and accommodates the aforementioned bucket removal from and reinsertion into the lower housing, besides user access to the coin-return bucket.

Vandals may visit the payphone at any time. At the first visit, the vandal rips the coin-return bucket out through the housing window to make difficult user retrieval of deposited coins for calls not completed. When the vandal removes the bucket from the coin-operated payphone, the vandal may stuff the chute to block within the chute the coins being returned to customers. The vandal may then reinsert the bucket. The vandal returns at a later time, removes the bucket again, removes the chute blockage, and collects the money that was withheld from the unsuccessful customer caller. The ripping-our may be done by inserting a suitable tool, such as a crowbar or a large screwdriver, into the coin-return bucket and pushing down on the tool outer end, using as a fulcrum the lower edge of the bucket opening. (See lines 40–47, column 2 of U.S. Pat. No. 5,509,057 issued Apr. 16, 1996 to Anello, Diaz and Turk and assigned to Sandt Technology, Inc.)

The vandal may not reinsert the bucket. If he stuffs the chute, the coins will be held therein until he returns and unstuffs it and collects the coins somehow.

If the vandal did not stuff the chute, the coins fall on the floor of the lower housing where they cannot be easily retrieved by the unsuccessful telephone user. The vandal returns at times thereafter with a tool appropriate to retrieving easily coins from the bottom of the lower housing of the payphone.

When the vandal removes the bucket from the coin-operated payphone, the vandal may, instead of being content with coins intended to be returned to unsuccessful telephone customers, "peel back" the lower housing and gain access to the money already collected in the vault for periodic retrieval by telephone company collector.

3. Prior Art

The prior art includes the aforementioned U.S. Pat. No. 5,509,057. As particularly evident in FIG. 4 thereof, a left-hand outer-guard portion 62 is formed with a slot or window 63 which is no larger than the opening in the bucket 26 so that the parts of the portion 62 overlap the lip of the bucket 26. Thus any vandal effort to rip out the bucket as by a crowbar inserted into the bucket 26 and fulcrumed about the lower edge of the bucket opening, is thwarted by the outer edges 65 of the bucket engaging behind the outer-plate portion 62 and being held in place thereby.

In that patent, a right-hand outer-guard layer 60 overlaps the coin box 24 (vault) and precludes the door of the coin box 24 from being pried off by a sharp tool inserted between the door and the main frame 10 or drilled for the insertion of a liquid explosive. As observed in the patent, the outer plate lower portions 60 and 62 may be made in one piece.

It has been found expedient in some instances to employ only the guard lower-portions 60 and 62 in one piece, without or separate from the upper portion of the outer layer 32. This facilitates mounting the lower guard piece as a U-shaped layer or wrap on the telephone by welding the inside of its front wall or bight to the outside face of the vault door. The lower guard piece thus is only removable from the telephone when the coin collector who is the only person with a key to the vault, comes to unlock the vault door.

To accommodate this telephone company design, the patent guard slot 63 which is aligned with the bucket window, must be made larger to accommodate removal of the bucket therethrough by a maintenance person who is not equipped with a vault key for financial security reasons. Thus the benefits of a smaller window allowing parts of the portion 62 to overlap the lip of the bucket 26 and preclude vandal bucket removal, are lost and not available in the guard mounting redesign.

In a current commercially available design wherein the vault door is secured to the inside of the front wall of a vault and coin-return-bucket guard layer or wrap and a key is inserted through an aligned hole in the front face of the guard layer or wrap to unlock the vault door and free up the integral guard layer and vault door for removal, a guard ring whose coin-return window is sized so that the ring overlaps the lip of the coin-return bucket, is secured by externally driven screws to the inside of the front wall of the guard layer and about the guard layer's coin-return bucket window. Unfortunately, vandals unscrew the screws to push aside the guard ring and pry out the coin return bucket through the larger, coin-return-bucket window or slot in the guard layer.

SUMMARY OF THE INVENTION

Accordingly, it is an object of the invention to provide improved protection against vandalism for coin-return buckets and bank vaults.

Another object of the invention is to provide improved protection against vandalism for coin-return buckets of payphones that is compatible with the normal maintenance and collection procedures of telephone companies.

A more specific object of the invention is to block vandal removal of payphone coin-return buckets through a guard wrap's coin-return-bucket window by a guard ring (with a smaller coin-return window) that is secured from inside the vault layer.

A further object of the invention is to secure the guard ring from inside the vault wrap or layer and yet allow for the removal and insertion of the coin-return bucket (through the guard-layer coin-return-bucket window) without requiring removal of the entire vault guard by maintenance personnel who do not carry a bank vault key.

Yet another object of the invention is to provide improved protection against vandalism for coin-return buckets of payphones that is simple and easy of construction, readily used by maintenance persons using only their normal equipment, and that can be applied be applied to existing installations.

The objects of the invention are achieved by removably securing inside the guard wrap or layer the guard ring for the coin-return bucket. This is achieved by providing ready access to the inside face of the guard from above when the upper housing cover is removed by a maintenance person having a key therefor. Thus benefits of a smaller window allowing parts of the guard ring to overlap the lip of the coin-return bucket while precluding vandal bucket removal, are again realized.

In a preferred embodiment, the guard ring is positioned by mounting one or more slide guides on the upper inside surface of the guard wrap or layer and also a lower stop so that the guard ring may be easily slid into place behind the guard wrap or layer window and in front of the front edges of the coin-return bucket.

The front surface of the guard ring may be formed with a ridge about its interior opening to be fully received in the guard opening to lock the guard ring in place therein when its upper end is rocked forward about the lower stop.

To accommodate sliding of the ridged guard ring behind the guard wrap or layer, the upper slides may loosely embrace the guard ring, and thus of themselves not hold the ridged guard ring forward in the cover window. To hold the guard ring forward so that its ridge is seated in the window, a spacer plate is employed. The spacer plate is slid into position behind the upper end of the guard ring forwardly rocked within the upper slides.

The spacer plate is held in position behind the guard ring and within the slides by being formed with an upwardly extending slot in its bottom edge that is received on a short headed stud extending from the back surface of the upper end of the guard ring.

The securely located interior guard plate blocks vandal removal of the coin-return bucket. It does not block maintenance person removal of the coin-return bucket. The maintenance person first removes the upper housing cover. The maintenance person now has room for hand manipulation and may reach down with a thin pliers or the like into the narrow space between the front wall of the guard wrap and the lower housing cover to lift the spacer plate up and out, then rock the upper end of the guard ring backwards, and thereafter lift it up and out. All of these hand operations were facilitated by the removal of the upper housing cover.

The coin-return bucket is now cleared for normal removal procedures, which normally includes unscrewing a bayonet screw up out of the floor to unblock rocking the coin-return bucket and moving it out of the lower housing through the lower-housing cover window and guard wrap or layer window. For reinsertion, the procedure is reversed.

In a second embodiment of the invention, the guard ring is modified to, among other things, be of a size to fit fully within the guard window. Its lower end has a bracket or brackets extending down from its inside surface and behind the guard wrap or layer to preclude outward displacement of the lower end of the guard ring which in the guard's installed position rests in the removal path of the lip of the coin-return bucket. The upper end of the guard ring mounts at least one rearwardly-projecting headed stud that is received in a downwardly opening slot of a locking plate. The locking plate is received also on another rearward-projecting headed stud that is secured to the inside of the front wall of the guard wrap above its window. Both the guard ring and the locking plate may be conveniently removed and reinserted from above when the upper housing cover has been removed. Of course, the guard ring and locking plate may also be put in place prior to mounting the guard wrap or layer on the telephone.

A feature of this invention is that the coin-return bucket may also be immunized against vandal firecracker action at Fourth-of-July time. A guard solid-plate may be substituted for the guard ring to preclude insertion of an M-80 firecracker or the like into the coin-return bucket to blow open the telephone.

BRIEF DESCRIPTION OF DRAWINGS OF EMBODIMENTS OF THE INVENTION

These and other objects, features and advantages of the invention will become more apparent from a consideration of the following description of preferred embodiments of the invention, when considered with the appended drawings, wherein:

FIG. 3 is a view in perspective of the interior of a dismounted lower-housing guard wrap modified according to one embodiment of the invention;

FIG. 4 is an isolated view in perspective of the back side of the interior guard ring employed with the guard wrap of FIG. 3 and showing a headed stud;

FIG. 5 is a view in perspective of the front side of the interior guard ring of FIG. 4 and showing its inner perimeter ridge;

FIG. 6 is a view in perspective of a spacer plate employed with the guard wrap of FIG. 3 and guard ring of FIGS. 4 and 5;

DETAILED DESCRIPTIONS OF PREFERRED EMBODIMENTS OF THE INVENTION

Figure 1:
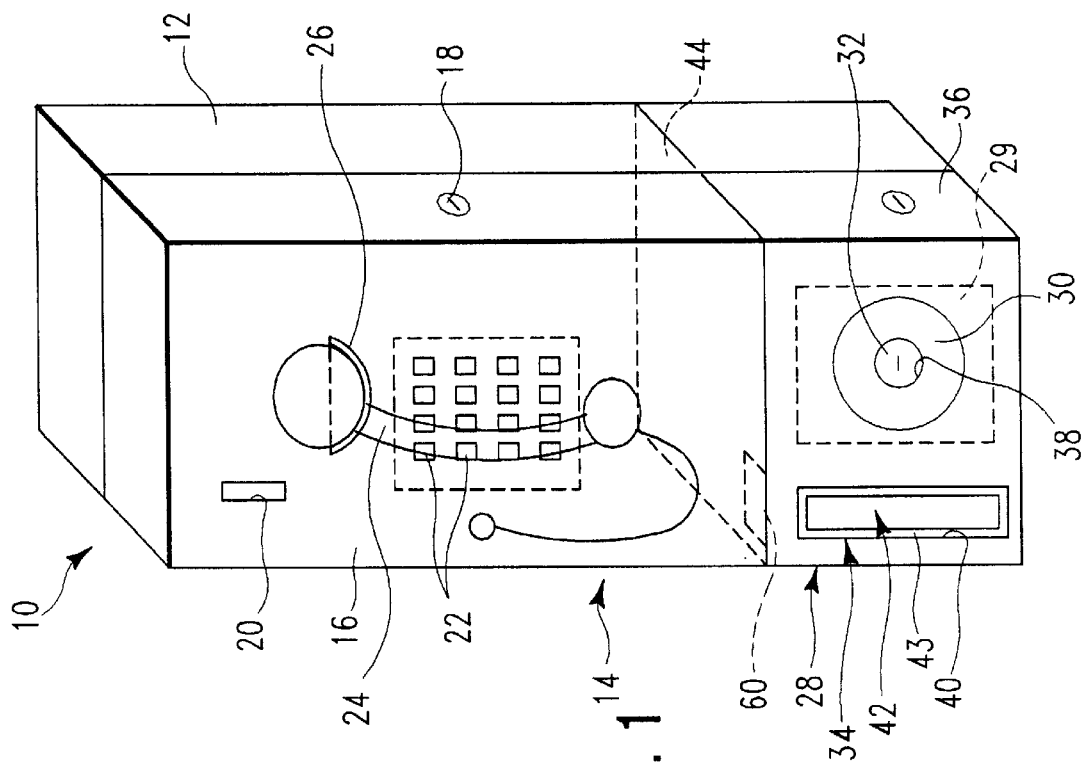
FIG. 1 is a view in perspective of a standard coin-operated telephone.

Referring now more particularly to the drawings, there is shown in FIG. 1 a standard coin-operated telephone to which the invention may be applied to thwart coin-return-bucket vandalism. The standard coin-operated telephone generally indicated by the numeral 10, includes a main frame 12 by which it is mounted on a support such as a wall not shown. The main frame 12 mounts an upper housing generally indicated by the numeral 14, and containing dialing, electronic switching, wiring and coin receiving gear and a front cover 16 normally secured in place via a side lock 18. The cover 16 bears a vertical slot 20 for coin insertion, a matrix of small apertures through which dialing keys 22 project, a receiver 24 for voice communication, and a within-the-housing pivoted cradle 26 for supporting the receiver 24 and disconnecting it electrically during periods of nonuse.

The main frame 12 also mounts a lower housing generally indicated by the numeral 28 and containing a bank or vault 29 for holding deposited coins for the telephone-company and that is closed-off by a removable door 30 having a central key hole for securing the interior of the lower housing by a lock 32. The lower housing 28 also contains a coin-return bucket 34 for collecting coins being returned to the would-be telephone user for immediate retrieval by the user.

The lower housing includes a U-shaped front cover 36 that may be secured to the housing by a side lock 37. The lower housing front cover 36 has an opening for accommodating the mounting of the vault door 30. The cover 36 also has a window 40 for insertion and removal of the coin-return bucket 34, and the bucket has a window 42 for the telephone user to extend a finger into the coin-return bucket 34 to retrieve returned coins. A lip 43 on the front end of the bucket surrounds the user-access opening 42 to the bucket. The external dimensions of the lip 43 are smaller than the internal dimensions of the lower housing cover window 40 and permit movement of the lip 43 and the rest of the bucket therethrough upon suitable initial rocking movement of the bucket.

The keys (not shown) to operate the upper housing lock 18 and the vault door lock 32, are different: the first being carried only by maintenance persons; the vault door lock key only by telephone-company official coin collectors. A floor or plate 44, appropriately fixed to the main frame 12, separates the upper housing from the lower one and secures the vault from above. However the coin-return bucket 42 is releasable from above to allow its removal through the window 40 in the lower housing front cover 36. Thus the maintenance person can remove the coin-return bucket 34 and reinstall it or another, without having access to the vault 29.

Figure 2:
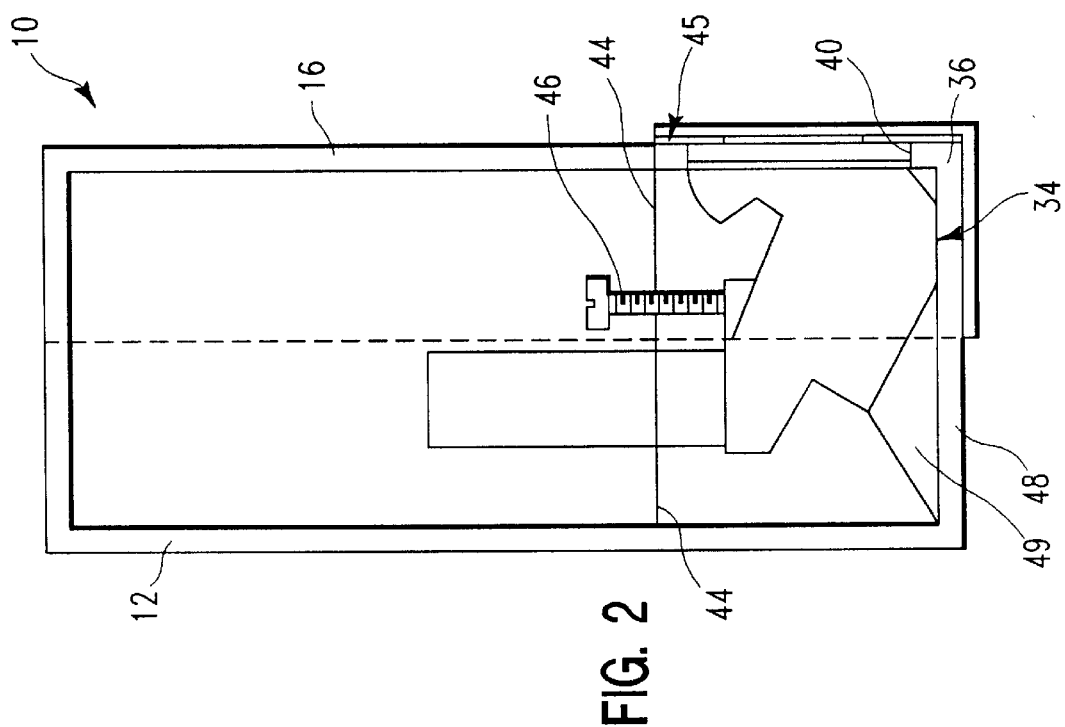
FIG. 2 is an interior view of the left side of a standard coin-operated telephone and showing an installed coin-return bucket and guard wrap that is welded to the bank vault door.

As best seen in FIG. 2, the conventional coin-return bucket 34 is normally secured in place by a bayonet screw 46 threadedly received in the floor 44 and extending downwardly therefrom to hold the coin-return bucket in place. The screw 46 engages a top portion of the bucket 34 to press the latter against the bottom 48 of the frame 12 and against a stop 50 on the bottom 48 to prevent initial rocking motion of the bucket necessary to facilitate its being slid out forward through the window 40 of the lower housing cover 36. Thus to remove a coin-return bucket 42, the screw 46 is normally backed-off by the maintenance person to allow the required initial rocking of the bucket to take place. Vandals overcome the restrictions of the screw 46 by crushing the upper side of the bucket 42 against the screw 46 with a tool inserted through the bucket window 42.

In high-crime areas, a U-shaped outer-guard wrap or layer 47 (FIGS. 2, 3, and 7) (with a bottom plate) is placed about the front portion of the lower housing 28 and its underside. It is secured in place by being welded on the inside of its upright bight portion to the outside of the vault door 30 and so as to leave a slight space 45 (FIG. 2) between it and the lower housing cover 36. A key hole 49 aligned with the key slot of the vault door lock 32 allows for unlocking the later and the integral removal of the guard wrap 47 with the vault door 30 by a telephone company vault money collector.

The front bight of the guard wrap is also formed with a window slot 51 which is aligned with the window slot 40 in the lower-housing cover 36 and may be of the same size, a size which is larger than the lip 43 of the bucket 34 so that the bucket may to be passed out through it by a maintenance person who is not equipped with a vault key for financial security reasons. A guard ring (FIGS. 4 and 5) generally indicated by the numeral 50 and which overlaps the lip 43 of the coin-return bucket 34 to prevent its unauthorized removal from the telephone 10, is secured to the inside of the front wall of the guard wrap 47.

The guard ring 50 has a rectangular frame 52 formed with an interior opening 54 that is smaller than the opening 40 in the guard wrap 51. The interior opening 54 is also smaller than the external dimensions of the lip 43 so that the bucket will not pass therethrough even when the bucket has been crushed against the screw 46. It is secured on the inside face of the guard wrap 47 to place it out of the reach of vandals. It may however be readily removed by a maintenance person who unlocks the upper housing 28 with the key therefor that he normally carries. Removal of the upper housing 28 provides space for the hand action necessary to remove the guard ring 50.

The guard ring 50 is mounted on the inside face of the guard wrap via slide guides 56 and a lower stop bracket 58. The space 45 between the upright bight of the guard wrap 47 and the lower-housing cover 36 resulting from welding the guard wrap 47 onto the vault door 30, permits maintenance person insertion of the guard ring 50 down the slide guides 56 till the ring strikes the stop bracket 58. The stop bracket 58 has a front-to-back depth approximating the thickness of the guard ring 50 so that a guard ring seated therein is held snugly against the inside face of the guard wrap.

The higher slide guides 56, by themselves, hold the guard ring 50 more loosely. This is because the front face of the ring is formed with a ridge 62 about the periphery of its interior opening 54 for seating in the guard wrap window 51 to help hold the guard ring firmly in place against lateral displacement.

The guard ring 50 is pushed against the inside face of the guard wrap by the installer after he has moved it down through the loosely fitting slide guides 56 to where it engages the stop bracket 58. The stop bracket 58 is of reduced front-to-back depth so that when the lower end of guard ring is placed therein, the ring lower end snugly engages the inside face of the guard wrap. The slide guides have a greater depth to accommodate during insertion the guard ring ridge 62 about the periphery of guard ring opening 54. During insertion, the guard ring ridge 62 strikes the inside face of the guard wrap. However, when the guard ring 50 has been inserted to its full depth, that is when it strikes the bracket 58, the upper end of the guard ring can be swung forward to locate the ridge 54 totally within the guard wrap window 51 and prevent lateral displacement of the guard ring. Further forward displacement of the guard ring is of course prevented by the engagement of the front face of the guard ring rectangular frame 52 with the inside face of the guard wrap.

Rearward displacement of the guard ring after installation is prevented by a generally rectangular spacer plate 64. The spacer plate 64 is inserted behind the guard ring 50 in the slide guides 56 to hold the ring firmly against the inside face of the guard wrap 57, the slide guides having a front-to-back depth approximating the combined thicknesses of the guard-ring rectangular frame 52 and the spacer plate 64. Thus the guard ring is now held against displacement in any direction with respect to the guard wrap window 51 and the coin-return bucket lip 43.

The guard ring 50 is supported in place against gravity by the stop bracket 58. The spacer plate 64 is supported in place in the slide guides 56 by a stud 66 extending from the rearward face of the rectangular frame 52 of the guard ring 50. A slot 68 extending upwards into the spacer plate from its lower edge allows the stud 66 to be spaced a distance above the guard-ring window 54 for greater sturdiness purposes. The stud 66 may be headed to help guide the spacer plate in place during installation.

In manufacturing, the guard ring 50 and spacer plate 64 would be make of suitable materials such as stainless steel and by appropriate methods. Conventional slide guides 56 and stop brackets 58 could be purchased and fixed as by welding to the interior face of the outer-layer about its window. The guard rings 50 and spacer plates 64 could then be mounted in the slide guides 56 before the guard wrap 47 is mounted on the telephone.

Field replacement of an existing guard wrap 47 with a guard wrap modified according to the invention, would be possible should telephone companies so desire, with special maintenance persons equipped with a key to the bank vault too. A substitute vault door 30 could have been previously welded to the inside of the guard wrap too.

In a normal field maintenance situation, the maintenance person would remove the upper housing cover 16 after unlocking lock 18 with his particular key. Then with a sharp-nosed tool, e.g. a thin needle-nosed pliers, he or she would pull up and out of the space 45 between the guard wrap 47 and the lower-housing cover 36, first the spacer plate 64 and then the guard ring 50 after tilting it back to where the guard ring ridge 62 cleared the inside edge of the guard wrap window 51. The coin-return bucket 42 can then be removed out through the lower housing window 40 and the guard wrap window 51 in the usual fashion.

Vandals though will be unable to remove the coin-return bucket 42 in their usual way. Inserting a crowbar or screwdriver or similar instrument may still allow the coin-return bucket to be crushed against the bayonet screw 46, but that will not render the bucket removable through the guard-ring window 54. The guard ring 50 would still block exit through guard wrap window 51.

Inability to profit from his nefarious activity, will discourage the vandal from his destructive activities in the first place, to the end that coin-return buckets 34 are no longer crushed against the bayonet screw 46. This will allow the telephone user to have normal access to coins being returned to him.

In the second embodiment of FIGS. 7–10, the guard ring 66 is not provided with a ridge; rather it is fit fully in the guard wrap or layer window 51 which may be of slightly larger size if desired. The guard ring 66 is held seated at its lower end in the window by a pair of downwardly extending brackets 68 depending from its back side and which not only prevent outward movement of the lower end of the guard ring, but also inward movement facilitating lateral displacement by engaging the front face of the lower-housing cover 36.

The upper end of the guard ring 66 is provided with rearwardly-extending studs 70 headed at their outer ends.

The studs 70 are received in upwardly extending slots 72 formed in the lower end of a locking plate 74. A more-deep, centrally-located upwardly extending slot 76 formed in the lower end of the locking plate receives a headed stud 78 extending rearwardly from the inside surface of the guard wrap 47, and serves to hold the locking plate 74 in place against gravity and in turn the upper end of the guard ring 66 directly against inward displacement and the via the headed studs 70 indirectly against outward displacement.

Figure 9:
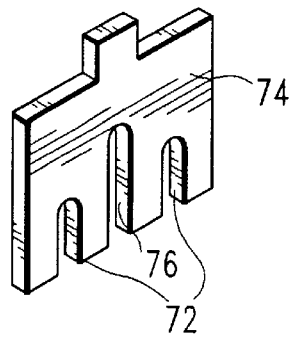
FIG. 9 is a view in perspective of the back side of the locking plate employed in the modification of FIG. 7 and showing its slots.
Figure 8:
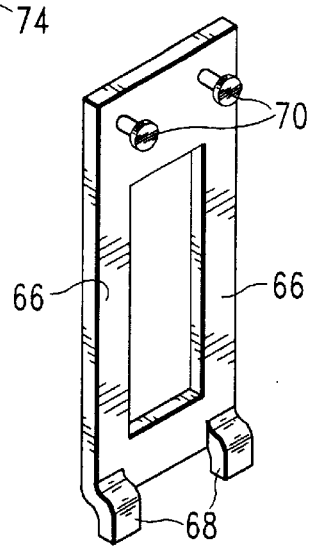
FIG. 8 is an isolated view in perspective of the back side of a guard ring employed in the modification of FIG. 7 and showing its integral lower brackets and two upper headed studs.
Figure 10:
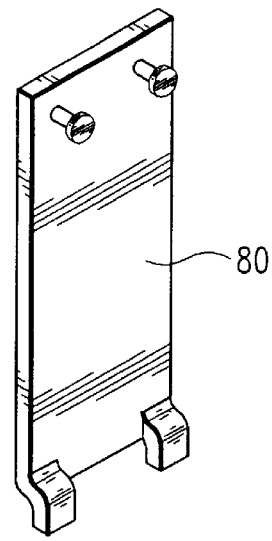
FIG. 10 is a view in perspective of a guard solid-plate used with the modification of FIG. 7 to minimize firecracker problems on the Fourth-of-July.
Figure 7:
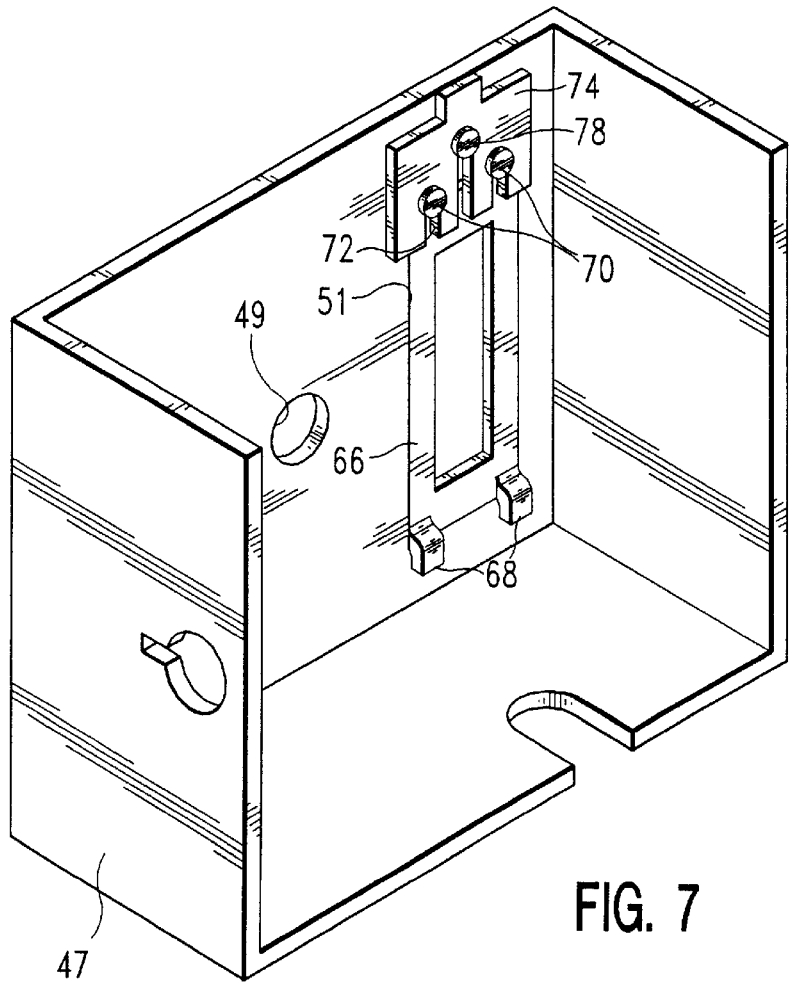
FIG. 7 is a view in perspective of the interior of a dismounted lower-housing guard wrap modified according to another embodiment of the invention.

The guard wrap 47 of FIGS. 7–9 may initially be installed with the guard ring 66 and locking plate 74 already in place. Of course, the bank/vault door 30 would normally also have been welded to the inside of the guard wrap 47.

After installation the guard ring 66 could be removed by a maintenance person who doesn't have a key for the bank/vault door lock 32. After unlocking and removing the upper housing 14, the maintenance person would reach down with a sharp nosed tool into the space 45 between the guard wrap 47 and the lower-housing cover 36 to first remove the locking plate 74. He could then reach down with the tool to grasp a guard-ring stud 70 and remove the guard ring 66 after moving the upper end of the guard ring inwards to clear the guard wrap window 51. After servicing the coin-return bucket 34, the procedure would be reversed.

FIG. 5 shows a guard solid-plate 80 may be substituted for the guard ring 52 of FIGS. 7 and 8 to preclude insertion of an M-80 firecracker or the like into the coin-return bucket to blow open the telephone. It includes the brackets 68 and the studs 70 of the guard ring 52 for mounting it securely in place. Of course, a similar adaptation may be made for the guard ring 50 of FIG. 4.

While there has been shown and described preferred embodiments of the invention, it will be appreciated by those skilled in the art that other and different applications may be made of the principles of the invention. It is intended therefore to be limited only by the scope or spirit of the appended claims.

What is claimed is:

1. In a coin-operated telephone supporting a fixed plate and an upper housing above the fixed plate and lower housing below the fixed plate; said lower housing containing a coin vault with a door requiring a special key, a coin-return bucket that must be rocked to be removed, and a removable cover for securing the vault and the bucket and formed with an opening accommodating removal of the vault door upon unlocking and formed with a window allowing therethrough removal of the bucket after rocking it;

said upper housing containing the upper end of a screw threadedly received in the plate and extending down into the lower housing to bear against the coin-return mechanism to block rocking movement thereof, and a removable cover securing the screw and normally fastened against removal by a lock requiring a telephone-maintenance-person's key;

and apparatus for blocking exit of the coin-return bucket through the lower cover window until after the upper housing has been removed and whether or not the screw has been backed off.

2. A telephone according to claim 1, wherein the apparatus includes a guard wrap having a window aligned with the lower-housing cover window and the guard-wrap window contains a displaceable ring having a smaller window than the lower-housing cover window.

3. A telephone according to claim 2, wherein the displaceable ring is movable down to an aligned position with the lower-housing cover window from above.

4. A telephone according to claim 3, wherein the displaceable ring is movable down after the upper housing has been removed through a space between the guard wrap and the lower-housing cover.

5. A telephone according to claim 4, wherein the displaceable ring is moved down within slide guides on the inside face of the guard wrap.

6. A telephone according to claim 5, wherein the displaceable ring is moved down within slide guides until it hits a stop.

7. A telephone according to claim 3, wherein the displaceable ring is formed with a ridge about its window that is snugly received within the guard wrap window when it is aligned therewith.

8. A telephone according to claim 3, wherein the displaceable ring is moved down within slide guides on the inside face of the guard wrap.

9. A telephone according to claim 8, wherein the displaceable ring is formed with a ridge about its window that is snugly received within the guard-wrap window when it is aligned therewith and the slide guides have a depth allowing downward movement of the displaceable ring in spite of its ridge behind the inside surface of the guard wrap.

10. A telephone according to claim 9, wherein a spacer plate is inserted within the slide guides behind the guard ring after the ring has been moved down to an aligned position with the guard-wrap window to secure the ring in the aligned position with its ridge within the guard-wrap window.

11. A telephone according to claim 10, wherein the lower edge of the spacer plate is notched and the notch is received on a stud extending rearward from the back face of the guard ring.

12. A telephone according to claim 11, wherein the stud is headed at its free end to hold the spacer plate from falling off.

13. A telephone according to claim 4, wherein the displaceable ring is formed on its lower end with brackets depending from its inside surface and that engage the outside surface of the lower-housing front cover and the inside surface of the guard wrap.

14. A guard wrap for securing against unauthorized removal the removable coin-return bucket in the lower housing of a payphone, comprising a front panel, a window in the panel through which the bucket may be removed from a telephone, a guard ring mounted in the window for blocking removal of a bucket therethrough, and maintenance-personnel only accessible means on the inside surface of the panel for holding the guard ring in place.

15. A guard wrap according to claim 14, wherein the guard wrap mounts slide guides, and a stop bracket for holding and aligning a guard ring moved in the slide brackets in aligned position with the cover window.

16. A guard wrap according to claim 15, wherein the guard ring is formed with a ridge about its window that is snugly received within the panel window when it is aligned therewith, and wherein the slide brackets have a depth allowing outward movement of the upper end of the guard ring to where its ridge is behind the inside surface of the panel.

17. A guard wrap according to claim 16, wherein the stop bracket holds the lower end of the guard ring against the inside surface of the panel.

18. A guard wrap according to claim 16, wherein a spacer plate is inserted within the slide guides behind the guard ring after the ring has been moved down to an aligned position with the panel window to secure the ring in the aligned position with its ridge within the panel window.

19. A guard wrap according to claim 18, wherein the lower edge of the spacer plate is slotted and the slot is received on a stud extending rearward from the back face of the guard ring.

20. A method of removing a coin-return bucket from below a horizontal plate in a coin-operated telephone having a window in its lower-housing cover through which the bucket is removed by a maintenance person and that is blocked with a guard ring in an aligned window in a guard wrap about the lower housing to discourage vandals from crushing the coin-return bucket against a screw normally preventing the initial rocking movement necessary to remove the coin-return bucket, comprising the steps of removing upwards through a space between the lower-housing cover and the guard wrap a plate from slide guides behind the guard ring, tilting the guard ring and removing it upwards through the space between the lower-housing cover and the guard wrap, and twisting the screw to back it off of the bucket and permit rocking of the bucket.

21. A telephone according to claim 13, wherein the displaceable ring is formed near its upper end with headed studs projecting rearwardly from the inside surface thereof, and the studs are received in slots formed in the lower edge of a locking plate having a central slot for receiving a headed stud extending rearwardly from the inside surface of the guard wrap.

22. A telephone according to claim 2, wherein the apparatus includes a guard wrap having a window aligned with the lower-housing cover window and the guard-wrap window contains a displaceable solid plate for preventing Fourth-of-July insertion of fire crackers into the coin-return bucket.

* * * * *